(12) United States Patent
McIlwain et al.

(10) Patent No.: US 11,526,641 B2
(45) Date of Patent: Dec. 13, 2022

(54) FORMAL GATED CLOCK CONVERSION FOR FIELD PROGRAMMABLE GATE ARRAY (FPGA) SYNTHESIS

(71) Applicant: Synopsys, Inc., Mountain View, CA (US)

(72) Inventors: Lisa McIlwain, Oregon City, OR (US); Fahim Rahim, Palo Alto, CA (US); Guillaume Plassan, Mountain View, CA (US); Dipti Ranjan Senapati, Pleasanton, CA (US)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 17/411,695

(22) Filed: Aug. 25, 2021

(65) Prior Publication Data

US 2022/0067251 A1    Mar. 3, 2022

Related U.S. Application Data

(60) Provisional application No. 63/069,979, filed on Aug. 25, 2020.

(51) Int. Cl.
| | | |
|---|---|---|
| *G06F 30/327* | (2020.01) | |
| *G06F 30/3323* | (2020.01) | |
| *G06F 30/3312* | (2020.01) | |
| *G06F 30/337* | (2020.01) | |
| *G06F 30/396* | (2020.01) | |
| *G06F 30/398* | (2020.01) | |
| *G06F 117/04* | (2020.01) | |

(52) U.S. Cl.
CPC ........ *G06F 30/327* (2020.01); *G06F 30/3323* (2020.01); *G06F 30/337* (2020.01); *G06F 30/3312* (2020.01); *G06F 30/396* (2020.01); *G06F 30/398* (2020.01); *G06F 2117/04* (2020.01)

(58) Field of Classification Search
CPC .............. G06F 30/327; G06F 30/3323; G06F 30/3312; G06F 30/337; G06F 30/396; G06F 30/398; G06F 2117/04
USPC ........... 716/104, 108, 113, 134, 136; 703/16
See application file for complete search history.

(56) References Cited

U.S. PATENT DOCUMENTS 6,664,833 B1 * 12/2003 Fischer ................. G06F 9/3869
                                                            327/170
6,871,292 B1 *  3/2005 Fischer ............... G06F 9/30018
                                                            712/E9.019

(Continued)

*Primary Examiner* — Phallaka Kik

(57) ABSTRACT

Some aspects of this disclosure are directed to implementing formal gated clock conversion for field programmable gate array (FPGA) synthesis. For example, some aspects of this disclosure relate to a method, including receiving network representation of a circuit design, determining a gated clock function corresponding to a target component of the network representation, and constructing an edge function based at least in part on the gated clock function. The method further includes performing a minimization of the edge function, and in response to a determination that the minimization of the edge function comprises a first term and a second term, providing a clock enable signal to the target component based on the first term, and providing a clock signal to the target component based on the second term.

20 Claims, 8 Drawing Sheets

(56) References Cited

U.S. PATENT DOCUMENTS

| | | | | |
|---|---|---|---|---|
| 8,104,012 B1* | 1/2012 | Klein | .................... | G06F 30/327 |
| | | | | 716/132 |
| 9,195,259 B1* | 11/2015 | Matiash | ................ | G06F 1/3275 |
| 2008/0231338 A1* | 9/2008 | Nairn | ........................ | G06F 1/08 |
| | | | | 327/292 |
| 2008/0301594 A1* | 12/2008 | Jiang | ................... | G06F 30/3312 |
| | | | | 716/132 |
| 2010/0235672 A1* | 9/2010 | Zhang | ..................... | G06F 1/324 |
| | | | | 713/400 |
| 2012/0139590 A1* | 6/2012 | Myers | ................... | G06F 1/3237 |
| | | | | 327/113 |
| 2019/0303624 A1* | 10/2019 | Moss | ...................... | H04L 9/003 |
| 2020/0097625 A1* | 3/2020 | Rabinovitch | ............. | G06F 1/06 |
| 2020/0364391 A1* | 11/2020 | Wakefield | ........... | G06F 30/3308 |

* cited by examiner

FORMAL GATED CLOCK CONVERSION FOR FIELD PROGRAMMABLE GATE ARRAY (FPGA) SYNTHESIS

RELATED APPLICATION

This application claims the benefit of U.S. Provisional Patent Appl. No. 63/069,979, filed Aug. 25, 2020, and entitled "FORMAL GATED CLOCK CONVERSION FOR FIELD PROGRAMMABLE GATE ARRAY (FPGA) SYNTHESIS," and is incorporated herein in its entirety.

TECHNICAL FIELD

The present disclosure generally relates to an electronic design automation (EDA) system. In particular, the present disclosure relates to gated clock conversion for field programmable gate array (FPGA) synthesis.

BACKGROUND

An EDA system that uses field-programmable gate arrays (FPGAs) to prototype electronic designs enable rapid prototyping and reduce time to market. Such EDA systems may perform logic synthesis from a register-transfer level (RTL) hardware description language to an FPGA netlist. FPGAs may support a relatively small number of unique clock signals. However, hardware designers writing RTL may create relatively large numbers of unique clock signals by including extensive embedded clock gating in clock functions. Hardware designers may create a large number of unique clock signals because the main target of their design may be an application-specific integrated circuit (ASIC) and not an FPGA.

An EDA system performing FPGA synthesis for ASIC prototyping must include methods to minimize the set of unique clock signals in a design as they synthesize the design. The number of unique clock signals in a design may be minimized using a process is called gated clock conversion (GCC). Performing GCC procedure involves identifying and separating enable functions from embedded gated clock functions leaving only a primary clock signal. The derived enable functions can be attached to dedicated enable pins of target registers, and the primary clock signal can be attached to clock pins of the target registers.

SUMMARY

Some aspects of this disclosure relate to a method for implementing formal gated clock conversion for field programmable gate array (FPGA) synthesis. For example, some aspects of this disclosure include receiving network representation of a circuit design, determining a gated clock function corresponding to a target component of the network representation, and constructing an edge function based at least in part on the gated clock function. The method further includes performing a minimization of the edge function and determining whether the minimization of the edge function includes a first term and a second term, providing a clock enable signal to the target component based on the first term, and providing a clock signal to the target component based on the second term.

Some aspects of this disclosure relate to the method that further includes constructing an edge function that is further based on a plurality of inputs corresponding to a support set of the gated clock function. According to some aspects, the edge function returns a logic true value when a transition of an input of the plurality of inputs creates a positive edge on the gated clock function. According to some aspects, the edge function returns a logic true value when a transition of an input of the plurality of inputs creates a negative edge on the gated clock function. According to some aspects of this disclosure, the method further includes constructing the edge function based on inputs that include a primary clock signal, an enable signal, a control signal, an output of a flip-flop, and an output of a latch. According to some aspects, the edge function is constructed recursively based on an edge sensitive input. According to some aspects, the edge function is constructed by determining whether an edge sensitive input to the gated clock function is remaining. Based on a determination that an edge sensitive input remains, the edge function is further constructed based on the edge sensitive input. According to some aspects, the target component is a flip-flop or flip-flop based memories. According to some aspects, the target component is a latch or latch based memories.

Some aspects of this disclosure relate to a system for implementing formal gated clock conversion for field programmable gate array (FPGA) synthesis. For example, some aspects of this disclosure relate to a memory storing instructions, and a processor, coupled with the memory and to execute the instructions. According to some aspects, the instructions, when executed, cause the processor to receive network representation of a circuit design, determine a gated clock function corresponding to a target component of the network representation, and construct an edge function based at least in part on the gated clock function. According to some aspects, the instructions, when executed, further cause the processor to perform a minimization of the edge function, and in response to a determination that the minimization of the edge function includes a first term and a second term, provide a clock enable signal to the target component based on the first term, and provide a clock signal to the target component based on the second term.

Some aspects of this disclosure relate to a memory storing instructions, and a processor, coupled with the memory and to execute the instructions, and the instructions, when executed, cause the processor to construct an edge function that is further based on a plurality of inputs corresponding to a support set of the gated clock function. According to some aspects, the edge function returns a logic true value when a transition of an input of the plurality of inputs creates a positive edge on the gated clock function. According to some aspects, the edge function returns a logic true value when a transition of an input of the plurality of inputs creates a negative edge on the gated clock function. According to some aspects of this disclosure, the method further includes constructing the edge function based on inputs that include a primary clock signal, an enable signal, a control signal, an output of a flip-flop, and an output of a latch. According to some aspects, the edge function is constructed recursively based on an edge sensitive input. According to some aspects, the edge function is constructed by determining whether an edge sensitive input to the gated clock function is remaining. Based on a determination that an edge sensitive input remains, the edge function is further constructed based on the edge sensitive input. According to some aspects, the target component is a flip-flop. According to some aspects, the target component is a latch.

Some aspects of this disclosure relate to a non-transitory computer readable medium including stored instructions, which, when executed by a processor, cause the processor to receive network representation of a circuit design, determine a gated clock function corresponding to a target component of the network representation, and construct an edge function based at least in part on the gated clock function. According to some aspects, the processor performs a minimization of the edge function, and in response to a determination that the minimization of the edge function includes a first term and a second term, provide a clock enable signal to the target component based on the first term, and provide a clock signal to the target component based on the second term.

Some aspects of this disclosure relate to a non-transitory computer readable medium including stored instructions, which, when executed by a processor, cause the processor to construct an edge function that is further based on a plurality of inputs corresponding to a support set of the gated clock function. According to some aspects, the edge function returns a logic true value when a transition of an input of the plurality of inputs creates a positive edge on the gated clock function. According to some aspects, the edge function returns a logic true value when a transition of an input of the plurality of inputs creates a negative edge on the gated clock function. According to some aspects of this disclosure, the method further includes constructing the edge function based on inputs that include a primary clock signal, an enable signal, a control signal, an output of a flip-flop, and an output of a latch. According to some aspects, the edge function is constructed recursively based on an edge sensitive input. According to some aspects, the edge function is constructed by determining whether an edge sensitive input to the gated clock function is remaining. Based on a determination that an edge sensitive input remains, the edge function is further constructed based on the edge sensitive input. According to some aspects, the target component is a flip-flop. According to some aspects, the target component is a latch.

This Summary does not attempt to provide the complete significance of any particular innovation, embodiment, or example as it can be used in commerce. Additionally, this Summary is not intended to signify key or critical elements of an innovation, embodiment or example or to limit the scope of the subject matter of this disclosure. The innovations, embodiments, and/or examples found within this disclosure are not all-inclusive, but rather describe the basic significance of the subject matter. Accordingly, one use of this Summary is as a prelude to a Detailed Description presented below.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
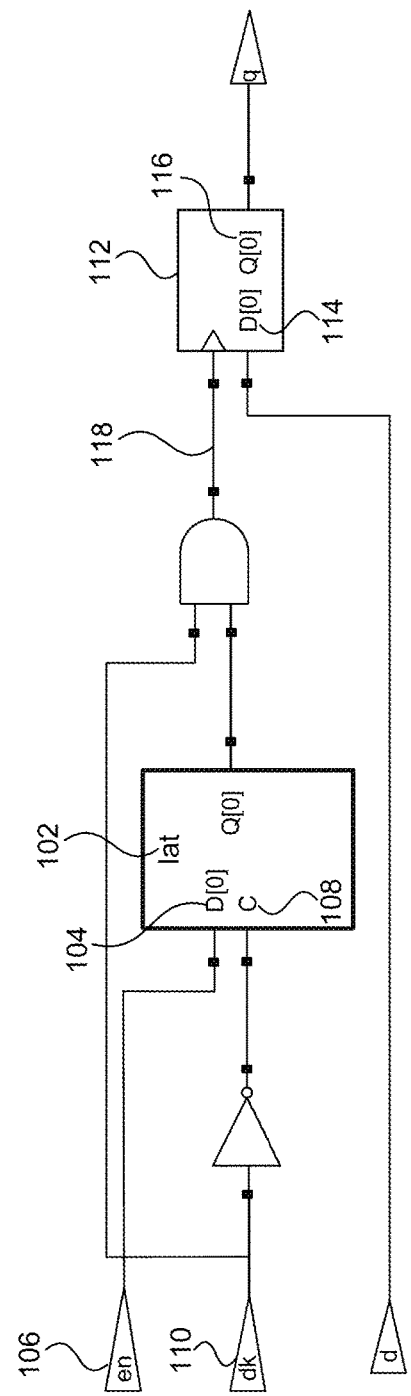
FIG. 1 illustrates an exemplary latch-based clock-gating circuit.

Aspects of the present disclosure relate to formal gated clock conversion for field programmable gate array (FPGA) synthesis.

An EDA system that uses Field-Programmable Gate Arrays (FPGAs) to prototype electronic designs may perform logic synthesis from a Register-Transfer Level hardware description language (RTL) to an FPGA netlist. FPGAs support only a small number of unique clock signals. According to some aspects, an EDA system performing FPGA synthesis for ASIC prototyping can solve the problem of limited unique clock signal availability by minimizing the set of unique clock signals in a design as the design is synthesized.

According to some aspects, the number of unique clock signals in a design may be minimized using gated clock conversion (GCC). Performing GCC may involve identifying and separating enable functions from embedded gated clock functions leaving only a primary clock signal. The derived enable functions can be attached to dedicated enable pins of target registers and the primary clock signal can be attached to clock pins of the target registers.

GCC may be performed using purely structural methods. Using a structural method involves examining the topography of the design to be synthesized to identify specific structural patterns that are known clock-gating structures. Specific structural patterns that are identified can be remapped to separate enable and clock signals. However, the structural methods are inherently limited to succeed only when known patterns exist and can be matched. Since clock gating is a functional design method, structural pattern matching necessarily fails to match and convert many gated clock functions.

Digital circuits, such as an application-specific integrated circuit (ASIC), use a gated clock function. A gated clock function can be a logical function of inputs, including one or more primary clocks, and one or more control signals, including one or more, enable signals. According to some aspects, a gated clock function "gated-clock" may be represented as Boolean AND of a primary clock signal "primary_clock" and an enable control signal: gated_clock=AND (primary clock_enable). According to some aspects, when a primary clock signal primary_clock rises, it produces a rising edge on gated clock function, gated_clock, when the enable control signal is high. According to some aspects, an objective of GCC is to identify and separate an enable function from an embedded gated clock function leaving only a primary clock signal. According to some aspects, the derived enable functions can be attached to dedicated enable pins of target registers, and the primary clock signal can be attached to clock pins of the target registers.

According to some aspects, given a gated clock function, GCC procedure may extract the enable function between reading registers' clock pins and the primary clock. According to some aspects, completed GCC may include extracting an enable function from complex combinational and sequential gated clock functions, including unspecified permutations of combinational gates, sequential gates, and clock generators.

According to some aspects, formal logical methods may be applied to distinguish and separate enable functions from clock functions in gated clock functions. According to some aspects, instead of analyzing the circuit that is to be synthesized as a network of physical structures, the circuit is represented as a function that is representative of a Boolean function. According to some aspects, using functional analysis allows application of Boolean minimization techniques to derive specific enable functions that gate individual primary clocks.

According to some aspects, using a functional analysis, rather than a structural analysis, achieves complete conversion of gated clock functions to separate clock and enable functions. Using a functional analysis approach may allow successful FPGA prototyping of designs that otherwise cannot be prototyped.

Each of these aspects, and other aspects, of the present disclosure, bring about the technical advantage of solving the problem of limited clocking resources during FPGA synthesis by minimizing the set of unique clock signals in a design. Additionally, according to some aspects of this disclosure, using functional analysis to separate clock enable functions from gated clock functions results in a complete gated clock conversion. Other technical advantages are also apparent from the description and drawings throughout this disclosure.

According to some aspects, gated clocks are included in circuit designs to shut down portions of the circuit that are not in use, thereby conserving power. According to some aspects, a gated clock is a clock signal that is a function of a primary clock signal and one or more inputs, such as clock enable signals. According to some aspects, a gated clock signal may be generated using a latch-based circuit or a generated-clock-based circuit.

FIG. 1 illustrates an exemplary latch based clock gating circuit. Latch based clock gating has a level-sensitive latch to hold an enable signal from an active edge of the clock until an inactive edge of the clock. For example, sequential clock gate 100 includes latch 102 with data pin 104 and clock pin 108. Data pin 104 is electrically coupled to enable signal 106, and clock pin 108 is electrically coupled to an inverse of primary clock signal 110, which is to be gated. In this example, since the latch captures the state of the enable signal and holds it until the complete clock pulse has been generated, the enable signal need only be stable around the rising edge of the clock. Sequential clock gate 100 may suppress glitches that occur in combinational clock gates on edge enables. Flip-flop 112 may receive input data at pin 114 and generates output data at pin 116. An output of latch 102 is AND-gated with the clock signal 110 to generate gated clock signal 118 that is input to the clock pin of flip-flop 112.

Figure 2:
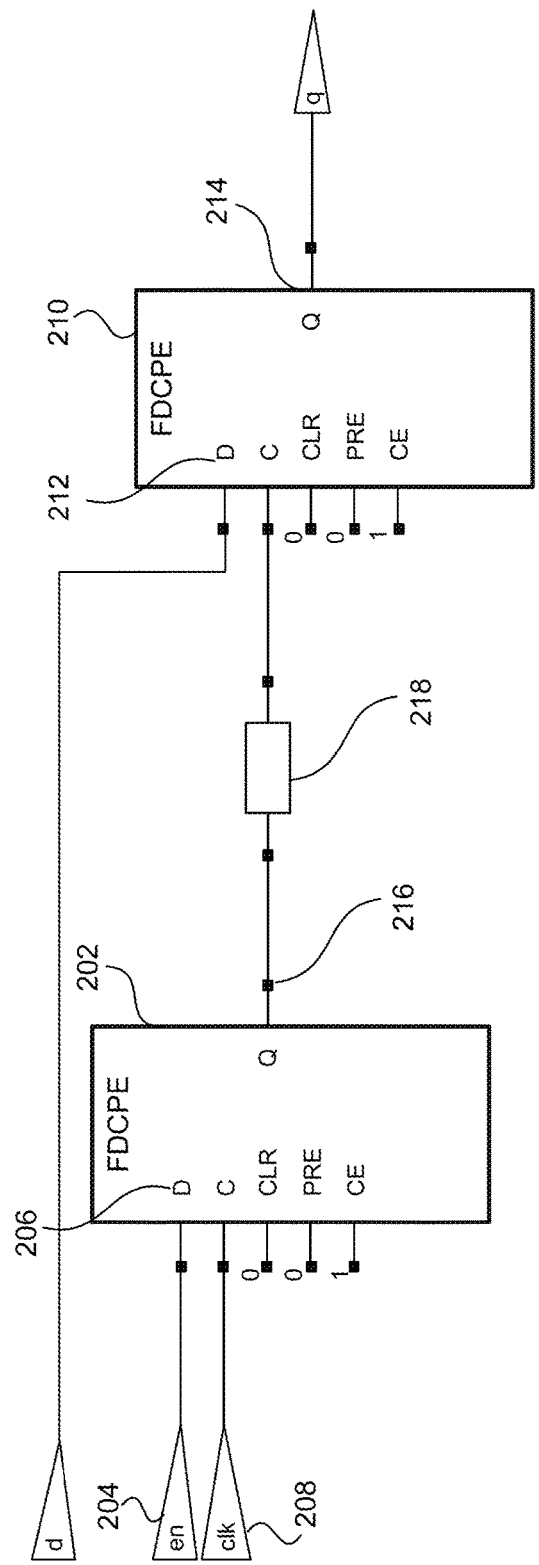
FIG. 2 illustrates an exemplary generated-clock based clock-gating circuit.

FIG. 2 illustrates an exemplary generated-clock based clock-gating circuit. For example, gated clock functions includes a clock generator. In this example, clock generator 200 includes a flip-flop 202 having data pin 206 electrically coupled to an enable signal 204 and having a clock pin electrically coupled to a clock 208, which is the primary clock to be gated. The flip-flop 202 is a D-flip-flop with clear (CLR), preset (PRE), and enable (CE) pins. Output of flip-flop 202 is the gated clock signal 216. The gated clock signal passes through buffer 218. The flip-flop 210 receives the gated clock signal as input at its clock pin and receives data input at data pin 212 to produce output at pin 214.

As shown in FIGS. 1-2, types of gated clocks include latch-based clocks and generated clocks. According to some aspects, GCC involves identifying and separating an enable function from an embedded gated clock function leaving only a primary clock signal. According to some aspects, the derived enable functions can be attached to dedicated enable pins of target registers, and the primary clock signal can be attached to clock pins of the target registers.

Figure 3:
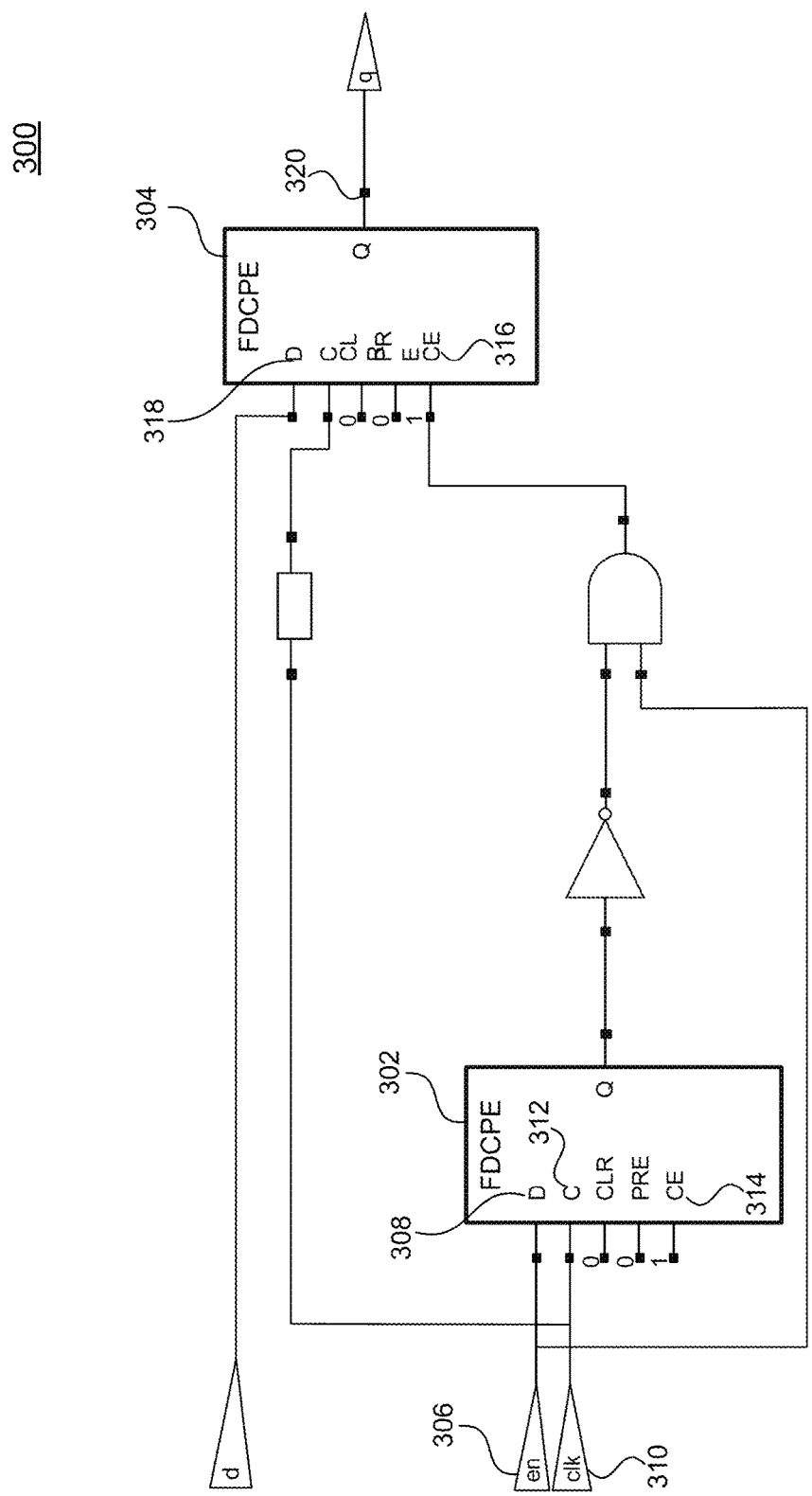
FIG. 3 illustrates an exemplary post gated clock conversion (GCC) transformation of a generated-clock based clock-gating circuit.

FIG. 3 illustrates an exemplary post GCC transformation of a generated-clock based clock-gating circuit. GCC transformation of a clock gating circuit, according to some aspects of this disclosure, will be discussed below in detail. Post GCC, the primary clock signal 310 is directly connected to the clock pin of flip-flop 304. Flip-flops 302 and 304 are each a D-flip-flop with clear (CLR), preset (PRE), and enable (CE) pins. Flip-flop 302 may also receive an enable signal 306 at a data pin 308 of flip-flop 302 and the clock signal 310 at a clock pin 312. Enable pin 314 of flip-flop 302 may be set to an active high voltage level. In this example, an output signal of flip-flop 302 is inverted, and AND-gated with enable signal 306 and is input to enable pin 316 of flip-flop 304. In this example, the clock signal at the clock pin of flip-flop 304 is the primary clock signal 310. Flip-flip 304 may receive data at the data pin 318 and generates output at an output data pin 320.

According to some aspects, GCC transformation is useful when multiple sequential devices are sampled on different gated clocks. For example, in an FPGA, heavy clock resources are required when multiple sequential devices are sampled on different gated clocks. According to some aspects, after performing GCC, each enable function can be extracted independently from each gated clock and can be reconnected to the clock enable pin (CE) of each sequential device. The clock pins (C) can be connected directly to a primary clock, thereby optimizing FPGA resources.

Figure 4:
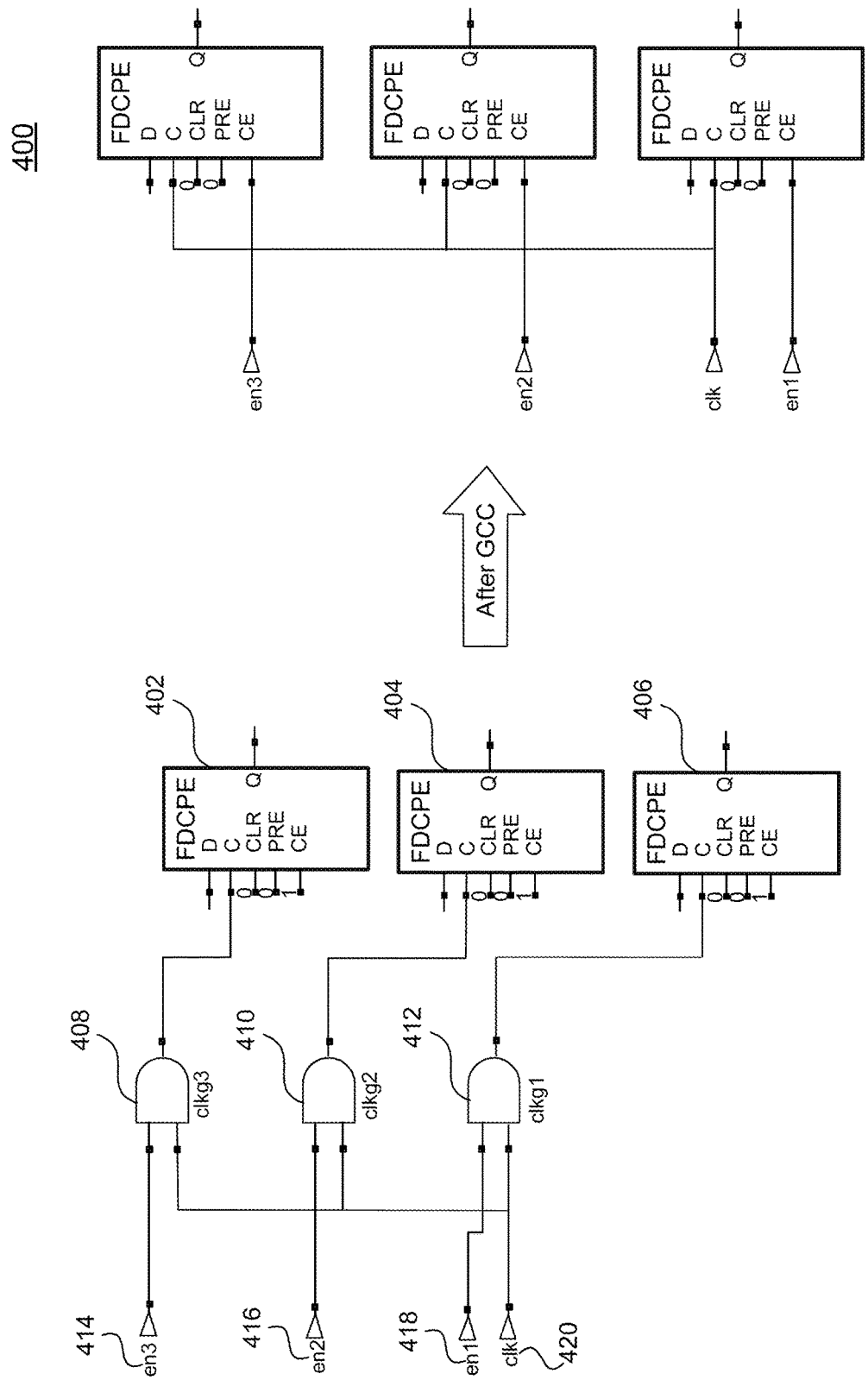
FIG. 4 illustrates GCC transformation of a plurality of gated clocks into a unique clock, according to an exemplary embodiment of the present disclosure.

FIG. 4 illustrates GCC transformation of a plurality of gated clocks into a unique clock, according to an exemplary embodiment of the present disclosure. Flip-flops 402, 404, and 406 are connected to gated clocks 408, 410, and 412, respectively. Gated clocks 408, 410, and 412 are generated based on enable signals 414, 416, 418 respectively, and a primary clock signal 420. As shown in FIG. 4, before performing GCC, the circuit has three gated clock functions resulting in three unique clocks signals. However, after performing GCC according to some aspects of the present disclosure, the circuit has only a single unique clock that is connected directly to the clock pins of flip-flops 402, 204, and 406. Further, in this example, enable functions 414, 416, and 418 are connected to the clock enable (CE) pins of flip-flops 402, 404, and 406, respectively. Accordingly, performing GCC can result in a reduction in the number of unique clock signals that are present in a circuit.

Figure 5:
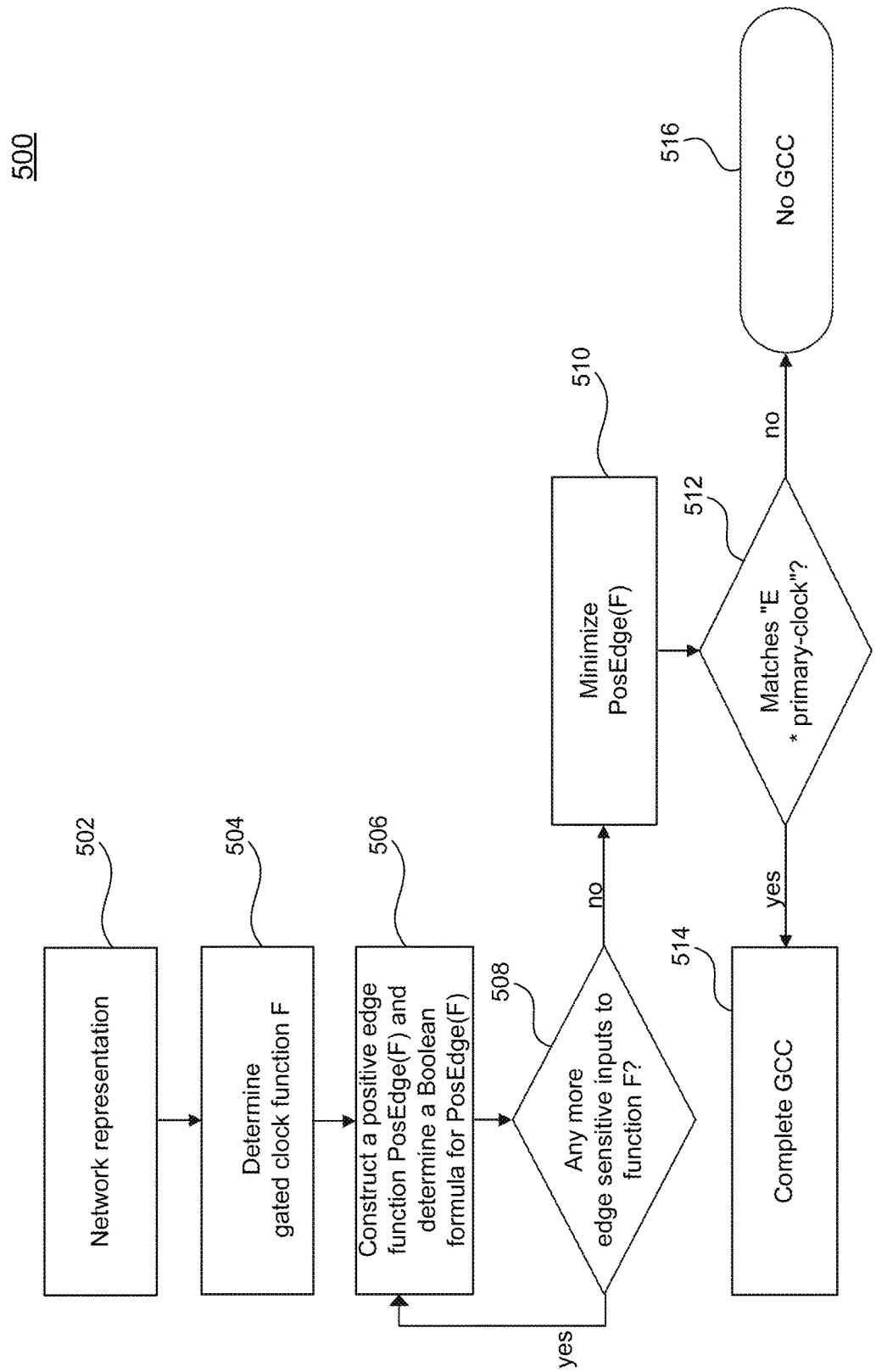
FIG. 5 illustrates a flowchart for performing formal gated clock conversion, according to some aspects of the disclosure.

FIG. 5 illustrates an example method for performing formal gated clock conversion, according to some aspects of the disclosure. FIG. 5 may be described with regard to elements of FIGS. 6-8. Method 500 may be performed by emulation system 702 of FIG. 7 and/or computer system 800 of FIG. 8. Method 500 may be performed on the circuits of FIGS. 1-2 to separate the primary clock from the gated clock. Method 500 may be performed to obtain the exemplary post GCC circuit of FIG. 3. Method 500 may be performed to obtain the exemplary GCC transformation of the plurality of gated clocks shown in FIG. 4. Method 500 is not limited to the specific aspects depicted in those figures, and other systems may be used to perform the method as will be understood by those skilled in the art. It is to be appreciated that not all operations may be needed, and the operations may not be performed in the same order as shown in FIG. 5.

At 502, network representation or specification of the circuit design that is to be emulated on an FPGA may be received using high-level description languages, such as System Verilog, SystemC, MyHDL, or OpenVera, etc. At 504, a model for a gated clock functions may be determined based on the received network representation or specification of the circuit design. For example in FIG. 1, the gated clock function 118 may be determined by performing an Boolean AND operation of clock 110 and the output Q of latch 102. Similarly, in FIG. 3, for example, the gated clock function 216 is determined as the output of flip-flop 202 having clock input 208 connected to the clock pin and enable 204 connected to data pin 206.

According to some aspects, a gated clock function has a set of inputs including primary clock signals, enable signals, driving flip-flops, and latches that are in the support set of the gated clock function. According to some aspects, an input is in the support set of the gated clock function when a positive or negative transition in the input may result in a change in a value or a change in the state of the gated clock function. By way of non-limiting example, a gated clock function, gated clock, has a set of inputs $\{i_0, \ldots, i_n\}$. According to some aspects, the gated clock can be expressed as a function F of the set $\{i_0, \ldots, i_n\}$: gated_clock= $F(i_0, \ldots i_n)$. For example, in FIG. 2, enable 204 and clock 208 are the inputs in the support set of the gated clock function that is connected to flip-flop 210. Similarly, in FIG. 4, for example, enable 414 and clock 420 are the inputs in the support set of the gated clock function that is connected to flip-flop 403, enable 416 and clock 420 are the inputs in the support set of the gated clock function that is connected to flip-flop 404, and enable 418 and clock 420 are the inputs in the support set of the gated clock function that is connected to flip-flop 406.

According to some aspects, for each register that is a target of a GCC transformation, a function may be defined that identifies transitions (positive or negative) of its support set, such as primary clocks, flip-flops, latches, etc. By way of a non-limiting example, if the function is defined as PosEdge(F), PosEdge(F) may return true when a transition creates a positive edge on F.

At 506, a Boolean representation for function PosEdge(F) is constructed. According to some aspects, the function PosEdge(F) can be constructed as follows: for each input in the support set $\{i_0, \ldots, i_n\}$ of the target, determine whether a positive or negative transition in the input corresponds to the gated clock function transitioning from logic false to logic true. According to some aspects, given an input $i_k$ in the support set of the target, the function PosEdge(F) returns true when the input $i_k$ transitions from a logic false to logic true and the gated clock function F transitions from logic false to logic true, or the input $i_k$ transitions from logic true to logic false and the gated clock function F transitions from logic false to logic true.

According to some aspects, function PosEdge(F) may be described using the following function:

$$\text{PosEdge}(F) = \Sigma_{k=0}^{n} \left[ (\text{PosEdgeEnable-}i_k) \& \text{PosEdge}(i_k) \right] | \left[ (\text{NegEdgeEnable-}i_k) \& \text{NegEdge}(i_k) \right].$$

In the above example function for PosEdge(F), the operator "|" denotes the Boolean OR operator, and the operator "&" denotes the Boolean AND operator. Further, in the above example function for PosEdge(F), the term PosEdge $(i_k)$ is a Boolean predicate that is true when the input "$i_k$" transitions from false to true state, and the term NegEdge($i_k$) is a Boolean predicate that is true when the input "$i_k$" transitions from true to false state.

In the above example function for PosEdge(F), the term PosEdgeEnable-$i_k$ is the Boolean predicate that is true if and only if the function F transitions from logic false to logic true when the input $i_k$ transitions from logic false to logic true. The term NegEdgeEnable-$i_k$ is the Boolean predicate that is true if and only if the function F transitions from a logic false to logic true when the input $i_k$ transitions from logic true to logic false state. The terms PosEdgeEnable-$i_k$ and NegEdgeEnable-$i_k$ can be computed using simple Boolean algebra as follows: PosEdgeEnable-$i_k$=~F($i_k$=0) & F($i_k$=1) and NegEdgeEnable-$i_k$=~F($i_k$=1) & F($i_k$=0), where the "~" operator denotes the Boolean negation NOT operator, the term F($i_k$=0) is the value of the function F when input $i_k$ is logic false, and the term F($i_k$=1) is the value of the function F when input $i_k$ is logic true.

According to some aspects, for each register that is a target of a GCC transformation, a function "NegEdge(F)" may be defined. The function NegEdge(F) may return a logic true value when a transition (positive or negative) of its support set, for example, primary clocks, flip-flops, latches, etc., creates a negative edge on F.

According to some aspects, a Boolean function for NegEdge(F) is constructed at 506. According to some aspects, the function NegEdge(F) can be constructed as follows: for each input in the support set $\{i_0, \ldots, i_n\}$ of the target, determine whether a positive or negative transition in the input corresponds to the gated clock function transitioning from logic true to logic false. According to some aspects, given an input $i_k$ in the support set of the target, the function NegEdge(F) returns true when the input $i_k$ transitions from a logic false to logic true and the gated clock function F transitions from logic true to logic false, or the input $i_k$ transitions from logic true to logic false and the gated clock function F transitions from logic true to logic false.

According to some aspects, function NegEdge(F) may be described using the following function:

$$\text{NegEdge}(F) = \Sigma_{k=0}^{n} \left[ (\text{PosEdgeEnable-}i_k) \& \text{PosEdge}(i_k) \right] | \left[ (\text{NegEdgeEnable-}i_k) \& \text{NegEdge}(i_k) \right].$$

In the above example function for NegEdge(F), the operator "|" denotes the Boolean OR operator, and the operator "&" denotes the Boolean AND operator. Further, in the above example function for NegEdge(F), the term PosEdge $(i_k)$ is a Boolean predicate that is true when the input "$i_k$" transitions from logic false to logic true, and the term NegEdge($i_k$) is a Boolean predicate that is logic true when the input "$i_k$" transitions from logic true to logic false.

In the above example function for NegEdge(F), the term PosEdgeEnable-$i_k$ is the Boolean predicate that is true if and only if the function F transitions from logic true to logic false when the input $i_k$ transitions from logic false to logic true. The term NegEdgeEnable-$i_k$ is the Boolean predicate that is logic true when the function F transitions from a logic true to logic false when the input $i_k$ transitions from logic state to logic false.

In the above example function for PosEdge(F) and NegEdge(F), for inputs $i_k$ that are flip-flops or latches whose originating edges are of interest, e.g. clock-gate latches and clock generators, the terms PosEdge($i_k$) and NegEdge($i_k$) can be recursively defined as follows: PosEdge($i_k$)=~$i_k$.Q & $i_k$.next-state and NegEdge($i_k$)=$i_k$.Q & ~$i_k$.next-state. In other words, if the current state of the latch or flip-flop is zero and the next state is a one, in such a case when the latch or flip-flop changes state, it will generate a rising edge. Likewise, if the current state of the latch or flip-flop is one and the previous state is a zero, in such a case when the latch or flip-flop changes state, it will generate a falling edge According to some aspects, the flip-flop targets of GCC may be positive-edge triggered flip-flops. As a non-limiting example, inputs of a register may be denoted as follows: PRE is an asynchronous set, CL is an asynchronous reset, CLK is a flip-flop posedge-sensitive clock, SET is a synchronous set, RST is a synchronous reset, EN is a latch level-sensitive enable, and D is a data input.

According to some aspects, a next state of a flip-flop may be represented as: flop.next-state=PRE?1:CLR?0:PosEdge (CLK)?(SET.prev?1:RST.prev?0:D.prev):Q, where the operator "?" denotes Boolean if-then-else operation. In other words, next state of a flip-flop can be determined as follows: if PRE is true, the next state is 1; otherwise, if CLR is true, the next state is zero; otherwise, if there is a PosEgde on CLK, then depending on SET and RST, a one or a zero or D are loaded; and if none of those are true, the register is holding state and the next state is Q. Further, in the above example expression for next state of a flip-flop, flop.next-state, "s.prev" indicates the value of s before the rising edge of CLK. In other words, if the functions of s and CLK overlap, the value of any shared signal is its value when CLK is 0.

According to some aspects, latch targets may be enabled at the positive edge of their enable. According to some aspects, the next state of a latch may be represented as: latch.next-state=PRE?1:CLR?0:EN?D:NegEdge(EN)?D.prev:Q, where the operator "?" denotes Boolean if-then-else operation. In other words, next state of a latch can be determined as follows: if PRE is true, the next state is 1; otherwise, if CLR is true, the next state is zero; otherwise, if the latch is enabled the next state is the data input D; otherwise, if the enable is falling, the next state is the previous state of the data; otherwise the next state is the state the data had when the enable was high; and if none of those are true, then the latch is holding state and the next state is Q.

At 508, a determination may be made whether any edge inputs to the gated clock function F that are potentially edge sensitive remain, according to some aspects. According to some aspects, edge sensitive inputs are inputs that may generate a clock edge. If edge inputs that are potentially edge-sensitive remain, the process repeats to 504. According to some aspects, edge inputs remain, after minimization of PosEdge(F), if any term PosEdge($i_k$) or NegEdge($i_k$) are left without being minimized for an input $i_k$ that is not a primary input to the circuit. According to some aspects, primary inputs are top-level input ports to the circuit. According to some aspects, primary inputs may be clock signals that are edge sensitive. According to some aspects, primary inputs may be enable signals that are not edge sensitive. According to some aspects, the PosEdge(F) function is constructed recursively until no edge sensitive inputs to the function remain. According to some aspects, the recursion continues until the only PosEdge/NegEdge inputs to the minimized function are primary inputs.

If there are no more edge inputs to the Boolean function F, the function PosEdge(F) can be minimized by applying Boolean minimization techniques at 510. According to some aspects, Boolean minimization may be performed using an algebraic manipulation method or the Karnaugh map method. According to some aspects, to minimize a Boolean expression, the truth table of the Boolean expression is formulated as a matrix in such a way that minterms that differ in the value of a single variable are adjacent to each other. Adjacent cells of the matrix are then grouped to identify product terms that eliminate complemented literals, resulting in a minimized version of the Boolean expression.

At 512 for flip-flop targets, a determination may be made whether the PosEdge(F) can be minimized into a Boolean expression that is in the form of Boolean AND of a first term which is a combinatorial Boolean function, E, and second term which is a Boolean predicate, PosEdge(primary-clock), that returns true when a primary clock transitions from false to true. According to some aspects, for flip-flop targets, a determination may be made whether the PosEdge(F) can be minimized into a Boolean expression that is in the form of Boolean AND of a first term which is a combinatorial Boolean function, E, and a second term which is a Boolean predicate, NegEdge(primary-clock), that returns true when a primary clock transitions from true to false. Accordingly, if a determination may be made that PosEdge(F) can be minimized to one of the following forms:

PosEdge(F)<=>E & PosEdge(primary-clock), or

PosEdge(F)<=>E & NegEdge(primary-clock), where, the notation "<=>" refers to equivalence via Boolean minimization operation, primary-clock refers to a single primary clock, and the combinatorial Boolean function, E, is not a function of the primary-clock, then GCC is possible. According to some aspects, when GCC is possible, the combinatorial function, E, is used as the clock enable for the target and either the primary clock or the reverse of the primary clock is used as the clock for the target. According to some aspects, for latch targets, a determination is made at 514 whether the PosEdge(F) can be minimized into a Boolean expression that is in the form of Boolean AND of a first term which is a combinatorial Boolean function, E, and a second term which is a primary clock. According to some aspects, for flip-flop targets, a determination may be made whether the PosEdge(F) can be minimized into a Boolean expression that is in the form of Boolean AND of a first term which is a combinatorial Boolean function, E, and a second term which is a compliment of a primary clock. Accordingly, if a determination may be made that PosEdge(F) can be minimized to to one of the following forms:

PosEdge(F)<=>E & primary-clock, or

PosEdge(F)<=>E & ~primary-clock, where primary-clock is a single primary clock, and the combinatorial Boolean function E does not depend on primary-clock, then GCC is possible. According to some aspects, when GCC is possible, the combinatorial function, E, is used as the clock enable for the target and either the primary clock or the reverse of the primary clock is used as the clock for the target.

At 514 for a flip-flop target, if the minimization of PosEdge(F) matches PosEdge(F)<=>E & PosEdge(primary-clock), GCC may be performed by connecting primary-clock directly to the clock pin of the target, and the first term "E" is used as the clock enable function. According to some aspects, for a latch target, if the minimization of PosEdge(F) matches PosEdge(F)<=>E & primary-clock, GCC may be performed by connecting primary-clock directly to the clock pin of the target, and "E" is used as the clock enable function.

According to some aspects, for a flip-flop target, if the minimization of PosEdge(F) matches PosEdge(F)<=>E & NegEdge(primary-clock), GCC may be performed at 514 by connecting inverse of the primary-clock to the clock pin of the target, and "E" is used as the clock enable function. According to some aspects, for a latch target, if the minimization of PosEdge(F) matches PosEdge(F)<=>E & ~primary-clock, GCC may be performed by connecting the inverse of the primary-clock to the clock pin of the target, and "E" is used as the clock enable function. Additionally or alternatively, at 516, if the minimization of PosEdge(F) does not match any of the above-specified forms, a determination is made that GCC is not feasible.

Figure 6:
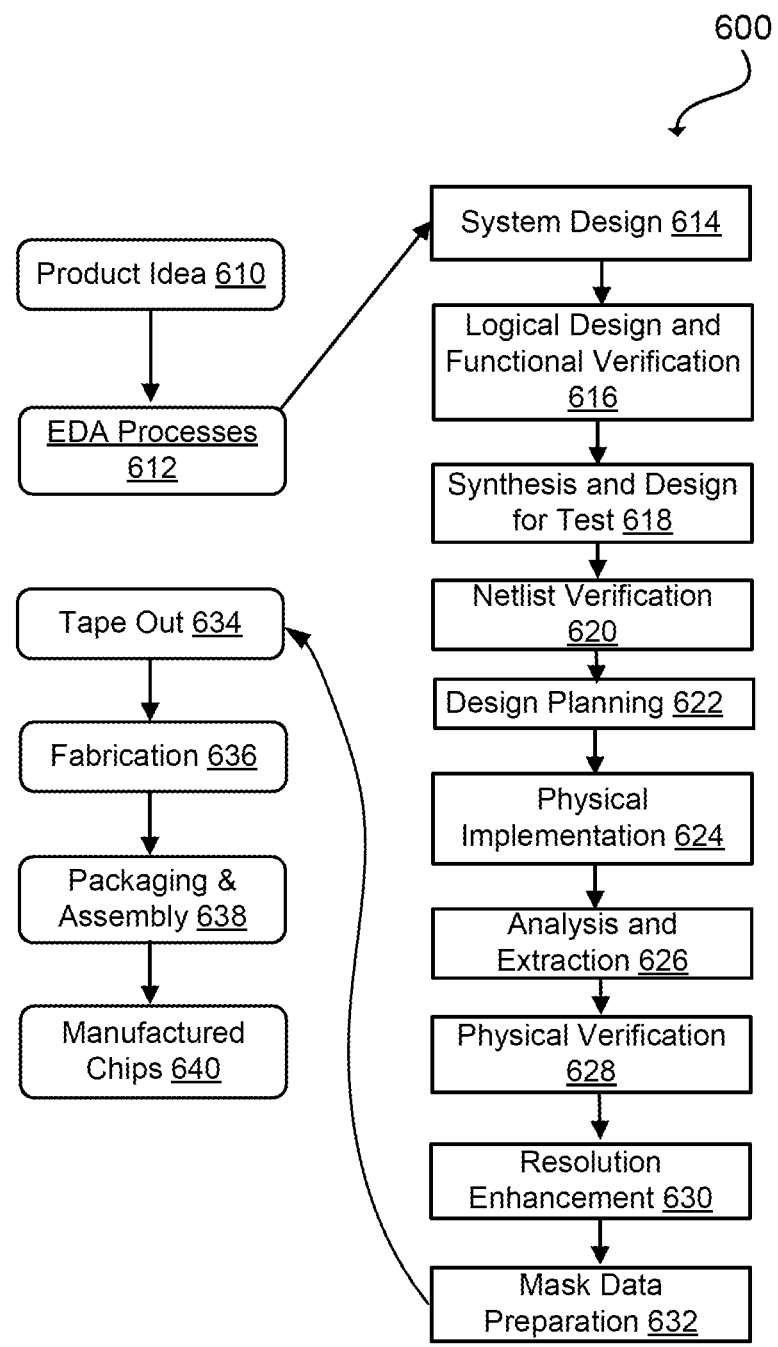
FIG. 6 depicts a flowchart of various processes used during the design and manufacture of an integrated circuit in accordance with some embodiments of the present disclosure.

FIG. 6 illustrates an example set of processes 600 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 610 with information supplied by a designer, information which is transformed to create an article of manufacture that uses a set of EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 636 and packaging and assembly processes 638 are performed to produce the finished integrated circuit 640.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 6. The processes described by be enabled by EDA products (or tools).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 800 of FIG. 8, or host system 707 of FIG. 7) may be used to store the programs and data structures that are used by some or all of the EDA products described herein, and products used for development of cells for the library and for physical and logical design that use the library.

Figure 7:
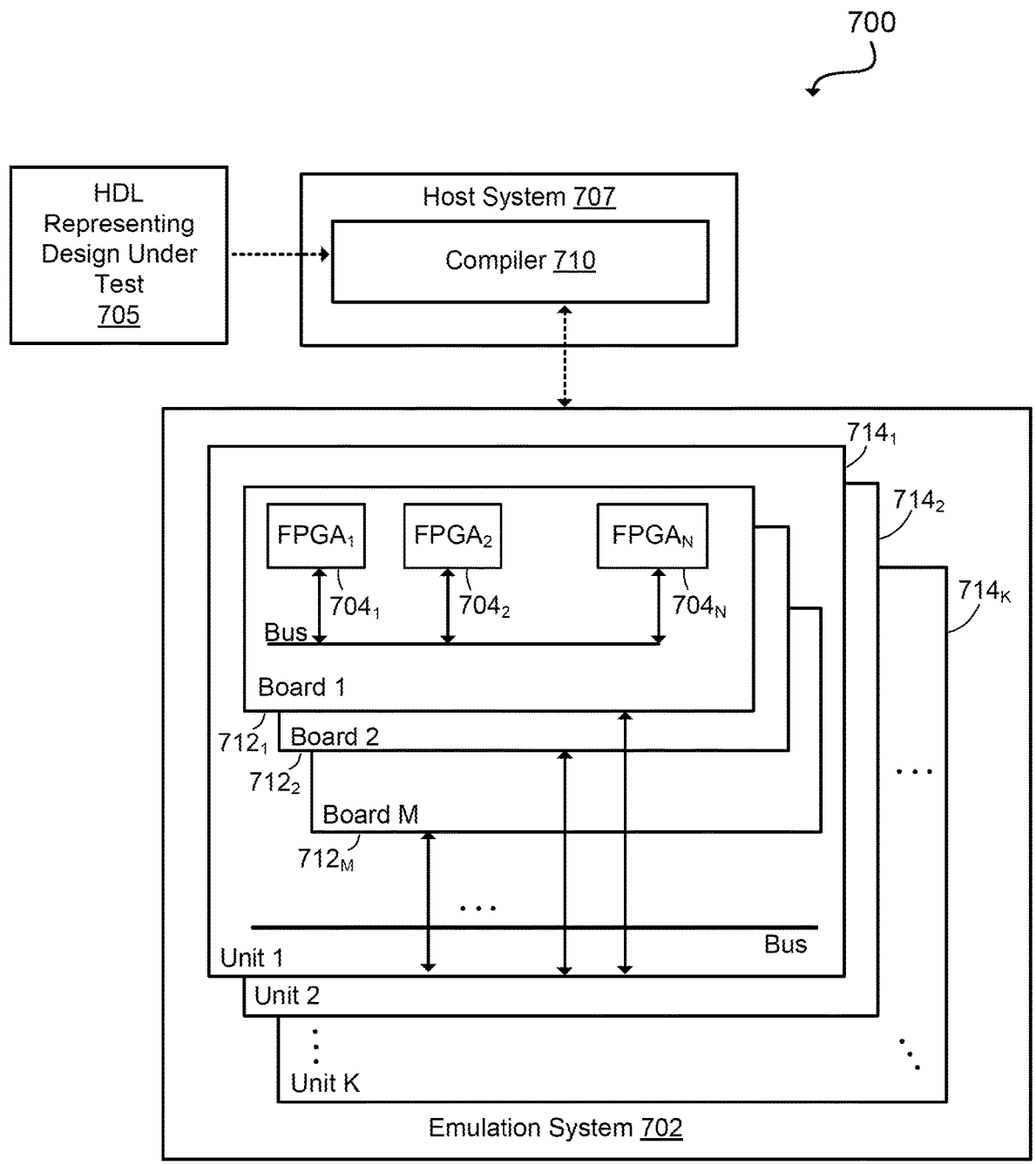
FIG. 7 depicts a diagram of an example emulation system in accordance with some embodiments of the present disclosure.

FIG. 7 depicts a diagram of an example emulation environment 700. An emulation environment 700 may be configured to verify the functionality of the circuit design. The emulation environment 700 may include a host system 707 (e.g., a computer that is part of an EDA system) and an emulation system 702 (e.g., a set of programmable devices such as Field Programmable Gate Arrays (FPGAs) or processors). The host system generates data and information by using a compiler 710 to structure the emulation system to emulate a circuit design. A circuit design to be emulated is also referred to as a Design Under Test ('DUT') where data and information from the emulation are used to verify the functionality of the DUT.

The host system 707 may include one or more processors. In the embodiment where the host system includes multiple processors, the functions described herein as being performed by the host system can be distributed among the multiple processors. The host system 707 may include a compiler 710 to transform specifications written in a description language that represents a DUT and to produce data (e.g., binary data) and information that is used to structure the emulation system 702 to emulate the DUT. The compiler 710 can transform, change, restructure, add new functions to, and/or control the timing of the DUT.

The host system 707 and emulation system 702 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 707 and emulation system 702 can exchange data and information through a third device such as a network server.

The emulation system 702 includes multiple FPGAs (or other modules) such as FPGAs $704_1$ and $704_2$ as well as additional FPGAs to $704_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 702 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $704_1$-$704_N$ may be placed onto one or more boards $712_1$ and $712_2$ as well as additional boards through $712_M$. Multiple boards can be placed into an emulation unit $714_1$. The boards within an emulation unit can be connected using the backplane of the emulation unit or any other types of connections. In addition, multiple emulation units (e.g., $714_1$ and $714_2$ through $714_K$) can be connected to each other by cables or any other means to form a multi-emulation unit system.

For a DUT that is to be emulated, the host system 707 transmits one or more bit files to the emulation system 702. The bit files may specify a description of the DUT and may further specify partitions of the DUT created by the host system 707 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 707 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 707 and/or the compiler 710 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 705 into gate level logic. For a DUT that is to be emulated, the design synthesizer sub-system receives a description of the DUT. If the description of the DUT is fully or partially in HDL (e.g., RTL or other level of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 8:
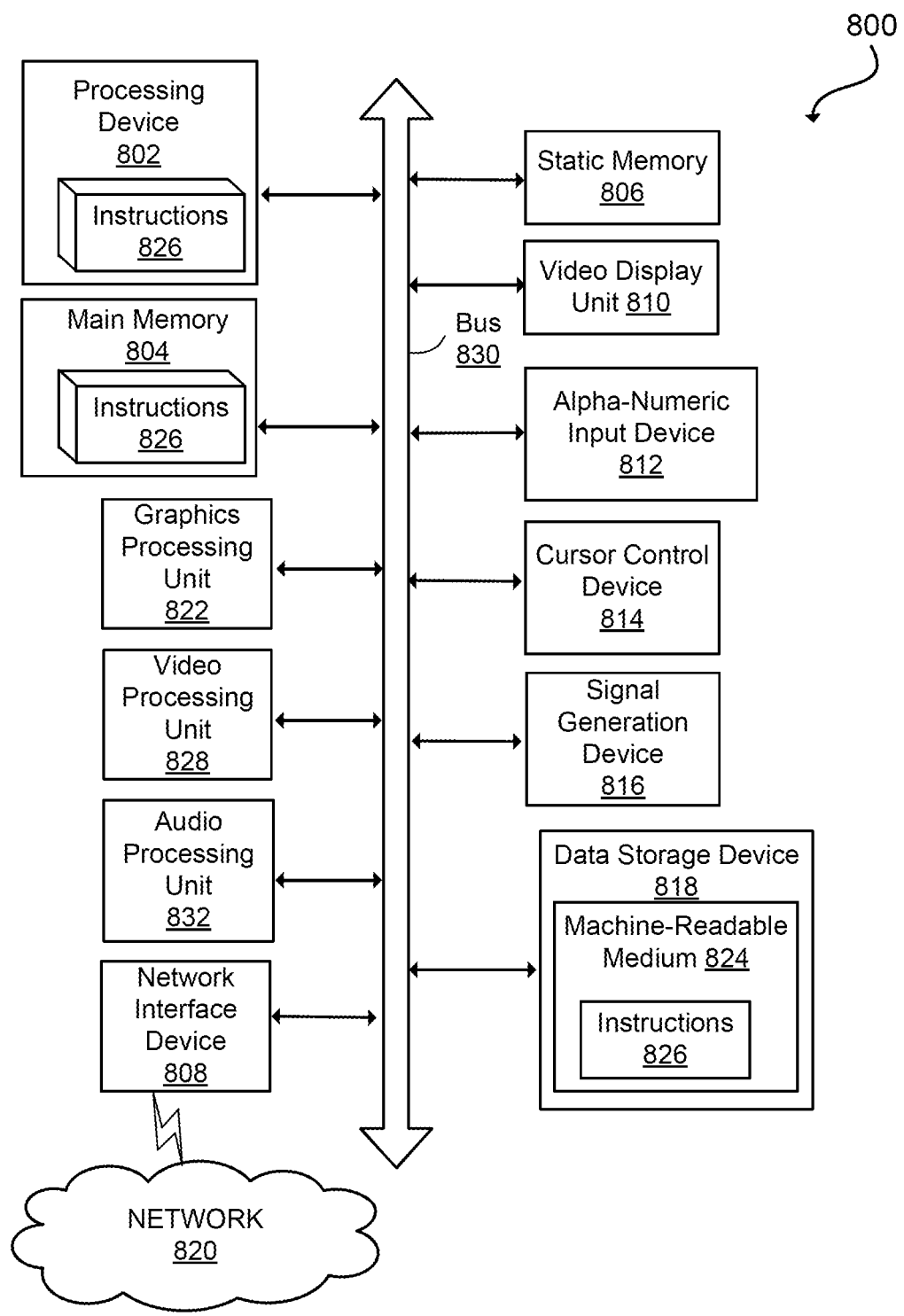
FIG. 8 depicts a diagram of an example computer system in which embodiments of the present disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
receiving network representation of a circuit design;
determining a gated clock function corresponding to a target component of the network representation;
constructing an edge function based at least in part on the gated clock function;
performing a minimization of the edge function; and
in response to a determination that the minimization of the edge function comprises a first term and a second term, providing a clock enable signal to the target component based on the first term, and providing a clock signal to the target component based on the second term.

2. The method of claim 1, wherein the gated clock function is based on a plurality of inputs corresponding to a support set of the gated clock function.

3. The method of claim 2, wherein the edge function returns a logic true value when a transition of an input of the plurality of inputs creates a positive edge on the gated clock function.

4. The method of claim 2, wherein the edge function returns a logic true value when a transition of an input of the plurality of inputs creates a negative edge on the gated clock function.

5. The method of claim 2, wherein the plurality of inputs comprises one or more of a primary clock signal, an enable signal, a control signal, an output of a flip-flop, and an output of a latch.

6. The method of claim 1, further comprising:
determining whether an edge sensitive input to the gated clock function is remaining; and
based on a determination that an edge sensitive input is remaining, constructing the edge function based on the edge sensitive input.

7. The method of claim 1, wherein the target component is a flip-flop or a latch.

8. A system comprising:
a memory storing instructions; and
a processor, coupled with the memory and to execute the instructions, the instructions when executed cause the processor to:
receive network representation of a circuit design;
determine a gated clock function corresponding to a target component of the network representation;
construct an edge function based at least in part on the gated clock function;
perform a minimization of the edge function; and
in response to a determination that the minimization of the edge function comprises a first term and a second term, provide a clock enable signal to the target component based on the first term, and provide a clock signal to the target component based on the second term.

9. The system of claim 8, wherein the gated clock function is based on a plurality of inputs corresponding to a support set of the gated clock function.

10. The system of claim 9, wherein the edge function returns a logic true value when a transition of an input of the plurality of inputs creates a positive edge on the gated clock function.

11. The system of claim 9, wherein the edge function returns a logic true value when a transition of an input of the plurality of inputs creates a negative edge on the gated clock function.

12. The system of claim 9, wherein the plurality of inputs comprises one or more of a primary clock signal, an enable signal, a control signal, an output of a flip-flop, and an output of a latch.

13. The system of claim 8, the instructions further cause the processor to:
- determine whether an edge sensitive input to the gated clock function is remaining; and
- based on a determination that an edge sensitive input is remaining, construct the edge function based on the edge sensitive input.

14. The system of claim 8, wherein the target component is a flip-flop.

15. A non-transitory computer readable medium comprising stored instructions, which
- when executed by a processor, cause the processor to:
- receive network representation of a circuit design;
- determine a gated clock function corresponding to a target component of the network representation;
- construct an edge function based at least in part on the gated clock function;
- perform a minimization of the edge function; and
- in response to a determination that the minimization of the edge function comprises a first term and a second term, provide a clock enable signal to the target component based on the first term, and provide a clock signal to the target component based on the second term.

16. The non-transitory computer readable medium of claim 15, wherein the gated clock function is based on a plurality of inputs corresponding to a support set of the gated clock function.

17. The non-transitory computer readable medium of claim 16, wherein the edge function returns a logic true value when a transition of an input of the plurality of inputs creates a positive edge on the gated clock function.

18. The non-transitory computer readable medium of claim 16, wherein the edge function returns a logic true value when a transition of an input of the plurality of inputs creates a negative edge on the gated clock function.

19. The non-transitory computer readable medium of claim 15, wherein the plurality of inputs comprises one or more of a primary clock signal, an enable signal, a control signal, an output of a flip-flop, and an output of a latch.

20. The non-transitory computer readable medium of claim 15, wherein the stored instructions, when executed, further cause the processor to:
- determine whether an edge sensitive input to the gated clock function is remaining; and
- based on a determination that an edge sensitive input is remaining, construct the edge function based on the edge sensitive input.

* * * * *